United States Patent [19]

Blaha

[11] 4,243,234

[45] Jan. 6, 1981

[54] SEAL AND SEAL ASSEMBLY

[75] Inventor: James G. Blaha, Painesville, Ohio

[73] Assignee: Towmotor Corporation, Mentor, Ohio

[21] Appl. No.: 12,162

[22] PCT Filed: Jan. 18, 1979

[86] PCT No.: PCT/US79/00026

§ 371 Date: Jan. 18, 1979

§ 102(e) Date: Jan. 18, 1979

[87] PCT Pub. No.: WO80/01505

PCT Pub. Date: Jul. 24, 1980

[51] Int. Cl.³ .................... F16J 15/32; F16J 15/34
[52] U.S. Cl. ................................. 277/84; 277/85; 277/95; 277/189; 308/187.1; 188/18 R
[58] Field of Search .................... 277/38, 39, 43, 48, 277/53, 81 R, 84, 85, 88, 92, 95, 152, 153, 165, 186, 205, 206 R, 189; 308/36.1, 187.1, 187.2; 305/11; 188/18 R

[56] References Cited

U.S. PATENT DOCUMENTS

| | | | |
|---|---|---|---|
| 3,006,701 | 10/1961 | Curtis | 308/187.1 |
| 3,438,639 | 4/1969 | Paulsen | 308/187.1 X |
| 3,447,848 | 6/1969 | Pitner | 308/187.2 |
| 3,533,491 | 10/1970 | Svenson | 188/18 R |
| 3,614,113 | 10/1971 | Burk | 305/11 X |
| 3,614,183 | 10/1971 | Berens et al. | 308/187.1 |
| 3,841,723 | 10/1974 | Kelso | 308/187.1 |
| 3,998,297 | 12/1976 | Aono | 188/18 R |
| 4,021,085 | 5/1977 | Willyard | 308/187.2 |
| 4,058,322 | 11/1977 | Fass | 277/96.1 |

FOREIGN PATENT DOCUMENTS

| | | | |
|---|---|---|---|
| 1003674 | 3/1957 | Fed. Rep. of Germany | 277/189 |
| 1139430 | 2/1957 | France | 308/187.1 |
| 1424192 | 2/1976 | United Kingdom | 188/18 R |

Primary Examiner—Robert S. Ward, Jr.
Attorney, Agent, or Firm—William B. Heming

[57] ABSTRACT

A seal (16) is positioned to prevent entry of foreign matter through an annular opening (26) between first and second members (12,14). The first and second members (12,14) are, for example, a stationary backing plate (20) and a rotatable hub (22) of a brake assembly (24) or a rotatable shaft and associated housing element. Foreign matter passing between the backing plate (20) and the hub (22), for example, can enter an associated brake drum (30) and interfere with effectiveness of the brake assembly (24). Apparatus (72) connects the seal (16) to the backing plate (20). The seal (16) has first and second legs (38,40) each having a sealing surface (58,60). The sealing surface contact a face (68) and outer surface (66) of the hub (22), respectively, to substantially block passage of foreign matter to the brake drum (30).

22 Claims, 3 Drawing Figures

SEAL AND SEAL ASSEMBLY

DESCRIPTION

1. Technical Field

The invention relates to a seal and a seal assembly in which the seal is positioned at a location sufficient for sealing an annular opening between first and second members rotatable one relative to the other. More particularly, the invention relates to a seal having first and second legs each having a sealing surface in contact with a respective one of a face and an outer surface of the second member.

2. Background Art

In the use of first and second members rotatable one relative to the other, it is desirable to seal an annular opening between the members to prevent passage of foreign matter through said annular opening. According to the present invention, a seal is used to block passage of foreign matter between the first and second member.

U.S. Pat. No. 3,998,297 which issued on Dec. 21, 1976, to Aono shows a brake assembly having a backing plate and cover plate connected thereto which form a labyrinth barrier to material passing between the backing plate and an associated brake drum. U.S. Pat. Nos. 3,533,491 and 3,463,273 which issued to Svenson & Morrison on Oct. 13, 1970, and Aug. 26, 1969, respectively, show similar embodiments of barriers on brake assemblies.

U.S. Pat. No. 4,043,620 which issued to Otto on Aug. 23, 1977, shows embodiments of seals used to seal an annular opening between a shaft and bearing supported housing. U.S. Pat. No. 3,687,464 which issued on Aug. 29, 1972, to Jackson et al shows an embodiment of a seal used to seal between surfaces of a shaft and related perpendicular abutment.

For example, in a lift truck, a brake assembly generally has a backing plate connected to an axle housing. A wheel of the lift truck mounts to a hub which is rotatably connected to an axle tube. The hub includes a brake drum portion. Brake shoes controllably ride against the brake drum portion to slow or stop rotation of the wheel relative to the axle tube. The backing plate is provided to prevent foreign matter from entering the drum which can interfere with the operation of brake shoes against the rotating hub. However, because of relative rotation between the backing plate and hub, an "annular opening" is necessarily maintained between said hub and backing plate. During operation of the vehicle, dirt, rock, or water for example, can enter through the annular opening and interfere with brake operation.

Heretofore, metal plates have been connected to one of the backing plate and hub and angularly extended over the other of said members to form a baffle or labyrinth against entry of the foreign matter. This type of solution, however, does not create a positive seal between the two surfaces and dirt and water can still enter the brake assembly, especially in the harsh environment of a work vehicle such as a lift truck.

Therefore, it is desirable to provide a seal and seal assembly which provides a positive seal between the surfaces of two members rotatable one relative to the other, such as the backing plate and hub, to substantially block entry of foreign matter therebetween.

DISCLOSURE OF INVENTION

In one aspect of the present invention, a seal has a body and first and second legs. The first leg has a sealing surface and is connected to the body and extends outwardly from a first side of the body. The second leg has a sealing surface and is connected to the body and extends outwardly from the first side of the body. The sealing surfaces are oriented generally perpendicular one relative to the other.

In another aspect of the present invention, a seal assembly has first and second members and a body and first and second legs. The second member has an outer surface and a face extending from said outer surface. The first and second members are rotatable one relative to another. The first leg has a sealing surface in sealing, slideable contact with the face of the second member. The second leg has a sealing surface in sealing, slidable contact with the second member radially at the outer surface of said second member. Means is provided for sealably connecting said body to the first member.

The first and second members are, for example, a backing plate and hub of a braking assembly, respectively. During rotation of the hub for driving an associated work vehicle, foreign matter can pass between the hub and backing plate and interfere with operation of brake shoes and a brake drum located within the hub. The seal is connected to the backing plate and the sealing surface of the first and second legs slideably contact the hub to seal an opening between the hub and backing plate for substantially blocking entry of interfering foreign matter to the brake drum.

BEST MODE FOR CARRYING OUT THE INVENTION

Figure 1:
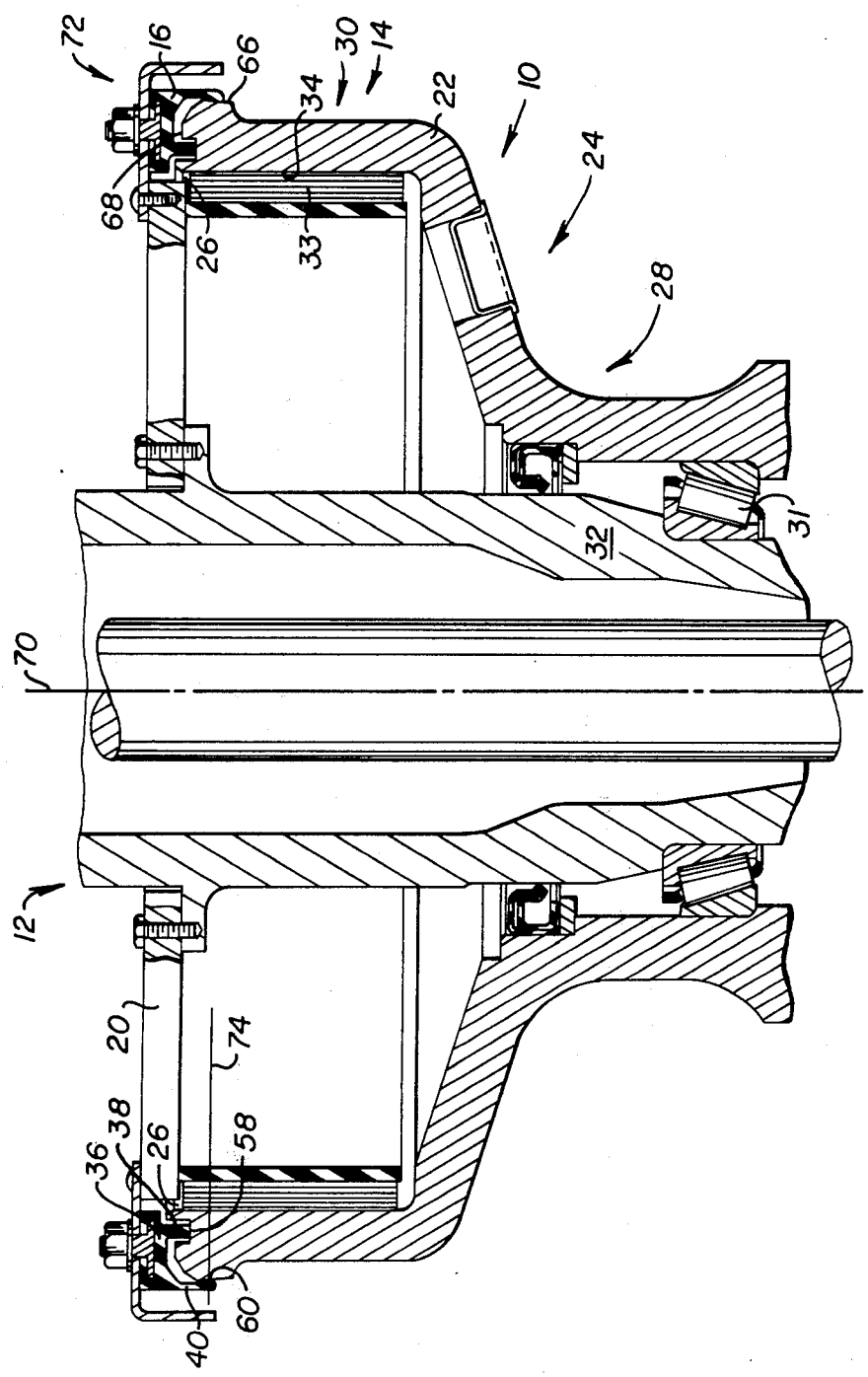
FIG. 1 is a diagrammatic cross-sectional view showing an embodiment of the seal assembly of the present invention on a brake assembly.
Figure 2:
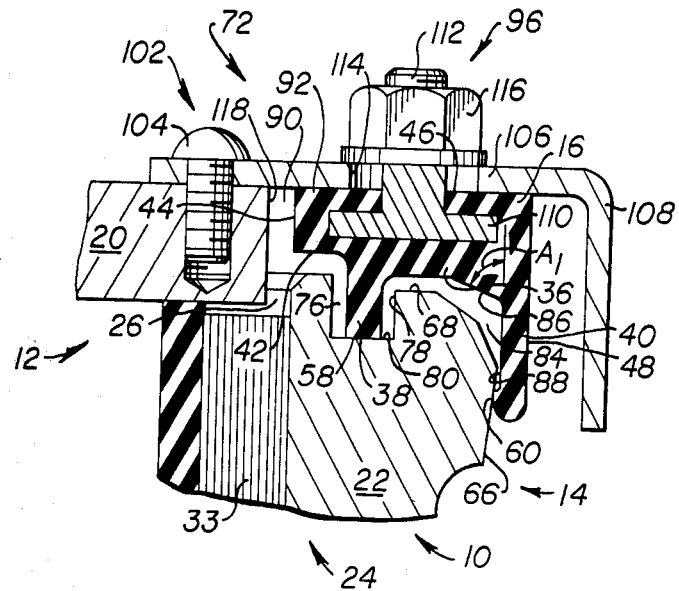
FIG. 2 is a diagrammatic enlarged cross-sectional view of a portion of the embodiment of FIG. 1.

Referring to FIGS. 1 and 2, a seal assembly 10 includes first and second members 12,14 and a seal 16. The first and second members 12,14 are shown, for example, as a backing plate 20 and a hub 22 of a brake assembly 24, respectively. The hub 22 and backing plate 20 are rotatable one relative to the other and define an annular opening 26 between the hub 22 and the backing plate 20, as is best seen in FIG. 2.

As is shown in FIG. 1, the hub 22 rotates relative to the backing plate 20. The backing plate 20 is connected to an axle tube 32 which is fixed to an associated work vehicle (not shown). The hub 22 includes a brake drum portion 30 against which brake shoes 33 are controllably operable to slow or stop rotation of the hub 22 relative to the backing plate 20. First means 28 is provided for supporting said hub 22 and backing plate 20 in rotation one relative to the other. Said first means 28 is shown, for example, as a bearing 31 positioned between the hub 22 and the tube 32. The bearing 31 supports the hub 22 relative to the backing plate 20 through the axle tube 32. Such brake assembly construction is well known in the art. The seal 16, as hereafter described, is positioned at a location sufficient for blocking passage of foreign matter through the annular opening 26 to maintain satisfactory operation of the brake assembly 24.

Figure 3:
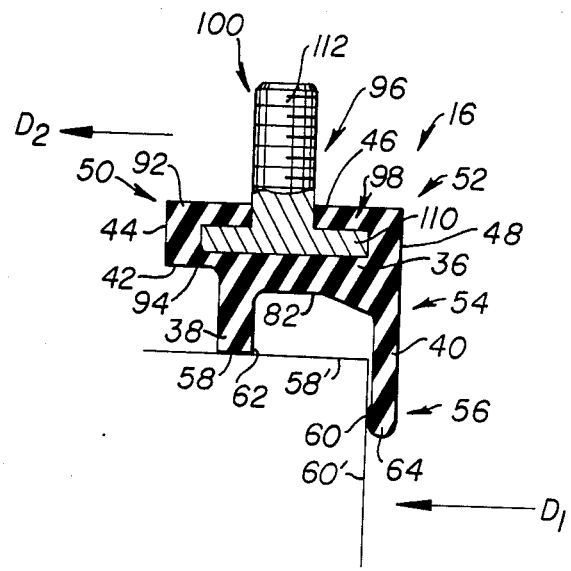
FIG. 3 is a diagrammatic cross sectional view of an embodiment of the seal of the present invention removed from the seal assembly shown in FIGS. 1 and 2.

Referring particularly to FIG. 3, the seal 16 has a body 36 and first and second legs 38,40. The body 36 has first, second, third and fourth sides 42,44,46,48 and first and second end portions 50,52. The first leg 38 is connected to the first end portion 50 of the body 36 and extends outwardly from said first side 42. The second leg 40 has first and second end portions 54,56 and is connected at the first end portion 54 to the second end portion 52 of the body 36. Said leg 40 extends outwardly from the first side 42, preferably generally parallel to said first leg 38. It is also desirable that said first and second legs 38,40 extend outwardly generally perpendicular from the first side 42 and that said second leg 40 extend a greater distance outwardly from said first side 42 than said first leg 38 extends from the first side 42. Said body 36 and legs 38,40 are preferably of unitary, elastomeric construction.

Each of said legs 38,40 has a sealing surface 58,60 which is contactable with the hub 22 in the installed position of the seal 16 in order to "seal" against said hub 22. The sealing surface 58 of the first leg 38 is positioned on a first end 62 of said leg 38. The sealing surface 60 of the second leg 40 is positioned on the second end portion 56 of the leg 40. Preferably, said second end portion 56 has a lip 64 extending generally inwardly from said second end portion 56 in a direction $D_1$ toward the first end portion 50 of the body 36. The sealing surface 60 is positioned on said lip 64. With reference to the seal 16 itself, the sealing surfaces 58,60 are oriented generally perpendicularly one relative to the other. In other words, planes 58',60' defined by said sealing surfaces 58,60, respectively, intersect at generally right angles. Said sealing surfaces 58,60 are shown substantially perpendicular one relative to the other as may be desirable.

Referring now to the seal assembly 10, the hub 22 has an outer surface 66, a face 68 and a central axis 70. The outer surface 66 is positioned generally along the axis 70 which is the axis of rotation of the rotatable hub 22. The face 68 extends from said outer surface 66 in a direction toward the central axis 70 to the inner surface 34 of the hub 22. It should be understood that the backing plate 20 can be rotatable without departing from the invention.

In the installed position of the seal 16 in the seal assembly 10, the body 36 is positioned adjacent and about the annular opening 26. Second means 72 hereinafter described is provided for sealably connecting the body 36 to the backing plate 20 for so positioning said body 36. The sealing surfaces 58,60 of the first and second legs 38,40 are in sealing, slidable contact with the face 68 and outer surface 66 of the hub 22, respectively. According to the present invention, the sealing surface 60 of the second leg 40 contacts said hub 22 radially relative to the central axis 70 at the outer surface 66. In other words, a line 74 passing substantially perpendicularly through the sealing surface 60 is also substantially perpendicular to said central axis 70 (FIG. 1). It is preferable, but not necessary in the seal assembly 10 that said sealing surfaces 58,60 be oriented generally perpendicular or substantially perpendicular one relative to the other as was described with respect to the individual seal 16. It is desirable that said sealing surfaces 58,60 urge against the face 68 and outer surface 66 of the hub 22, respectively, to promote initial seating of the seal 16 and continued sealing despite wear on the sealing surfaces 58,60.

In the preferred embodiment, the face 68 of the hub 22 has an annular opening 76 having sidewalls 78 and a bottom surface 80. The first leg 38 of the seal 16 extends into said opening 76 preferably at a location spaced from the sidewalls 78 of said opening 76. The sealing surface 58 of the first leg 38 slidably contacts said face 68 of the hub 22 at the bottom surface 80 of said annular opening 76. In other words, said first leg 44 forms a labyrinth type seal relative to said hub 22.

On the seal 16, the first and second legs extend outwardly from the first side 46 of the body 42 to define a generally U-shaped opening 82 with the body 36 of said seal 16. In position in the seal assembly 10, the seal 16 forms a first annular chamber 84 with said hub 22 owing to the configuration of said opening 74. The chamber 84 is defined by the face 68 and outer surface 66 of the hub 22, the first and second legs 38,40 and a first portion 86 of the first side 42 of the body 36 extending between said first and second legs 38,40. Said first portion 86 extends angularly from and relative to said second leg 40 to form an angle $A_1$ with a side 88 of the second leg 40. As is shown, the first portion 86 extends angularly from said second leg 40 to a point about midway between the first and second legs 38,40 and generally perpendicularly to said first and second legs 38,40 from said midway point to the first leg 38.

The installed seal 16 forms a second annular chamber 90 with the hub 22 and backing plate 20. Said chamber 90 is defined by said hub 22 and backing plate 20, the second means 72, the first leg 38 and an arm portion 92 of the body 36. The second annular chamber 90 is in communication with the annular opening 26 between the hub 22 and backing plate 20. On the seal 16, the arm portion 92 of the body 36 extends at substantially right angles to the first leg 38 in a direction $D_2$ from said first and second legs 38,40. Said arm portion 92 defines the second side 44 of the body 36 oriented generally parallel to the first leg 38 and a second portion 94 of the first side 42 of the body 36.

The seal 16 has a fastening element 96 having first and second portions 98,100. The second means 72 for sealably connecting said seal 16 to the backing plate 20 includes a mounting element 102 removably connectable to said fastening element 96 and the backing plate 20. In the seal assembly 10, said mounting element 102 is positioned about and connected to the backing plate 20 by cap screws, rivets 104 or the like to act as a shield preventing entry of foreign matter between the seal 16 and backing plate 20 and protecting the seal 16 from damage. First and second shield portions 106,108 of said mounting element 102 protect the third side 46 of the body 36, and the fourth side 48 of the body 36 and the second leg 40, respectively.

The first portion 98 of the fastening element 96 is connected to the body 36 of the seal 16. Preferably, said first portion 98 is an annular ring 110 positioned in or molded into and positioned along said body 36. The second portion 100 of the fastening element 96, shown as a plurality of flanges 112, extends outwardly from the third side 46 of the body 36 and is removably connected to the mounting element 102. The flanges 112 each extend through one of a plurality of openings 114 in the mounting element 102. A plurality of nuts 116 each threadably engage one of the flanges 112 to connect the fastening and mounting elements 96,102. The first portion 98 of the fastening element 96 can also be, for example, individual anchors molded into the body 36 and connected to respective flanges 112. In position on the seal assembly 10, the mounting element 102 extends from contact with an outer surface 118 of the backing plate 20 into contact at the first shield portion 106 with the third side 46 of the body 36 to sealably connect the seal 16 to the backing plate 20. The second shield portion 108 extends at generally right angles to the first shield portion 106 along and adjacent the second leg 40.

It should be understood that the seal 16 and seal assembly 10 can be of other configurations as is known in the art without departing from the invention.

INDUSTRIAL APPLICABILITY

In the use of the seal 16 in the seal assembly 10, the hub 22 rotates relative to the backing plate 20. The sealing surfaces 58,60 "seal" against the hub 22 to substantially block entry of foreign material through the annular opening 76 into the brake shoes 30 and drum 26. The seal 16 is preferably of abrasion resistant rubber to withstand the working environment of, for example, a work vehicle (not shown) associated with the brake assembly 24.

Installation of the seal 16 is done with the hub 22 removed. The mounting element 102 is first connected to the backing plate 20. The seal 16 is passed over the brake shoes 33 and the flanges 112 inserted in the respective openings 114 in the mounting element 102. The nuts 116 are partially threadably engaged on the flanges 112 to loosely secure the seal 16 to the mounting element 102.

Prior to tightening the nuts 116, the hub 22 is mounted on the brake drum 30 and directed into position relative to the seal 16. The angled first portion 86 of the first side 42 of the body 36 tends to center said seal 16 relative to the hub 22 by contacting the hub 22 and moving the seal 16 along the face 68 of the hub 22. When the hub 22 is positioned properly about the brake drum 30, the seal 16 is self centering in response to rotating said hub 22. The second leg 40 positions or self centers the seal 16 owing to the radial contact of the second sealing surface 60 with the outer surface 66 of the hub 22. The nuts 116 are finally tightened to effectively position the seal 16 and protect the brake drum 30.

The seal 16 tends to accommodate eccentricity of the rotating hub 22 relative to the backing plate 20 owing to the flexibility of the second leg 40 and the spaced relationship of the first leg 38 and the sidewalls 78 of the annular opening 76. Where the sealing surfaces 58,60 urge against the face 68 and outer surface 66 respectively, the seal 16 will gradually seat against the hub 22, particularly with respect to the sealing surface 56 of the first leg 38. Also, wear of the sealing surface 58 of the first leg 38 tends to move the second leg 40 along the outer surface 66 of the hub 22 to maintain the seal along said outer surface 66.

Other aspects, objects and advantages will become apparent from a study of the specification, drawings and appended claims.

I claim:

1. A seal assembly (10), comprising:
    a first member (12);
    a second member (14) having an outer surface (66), a face (68) and a central axis (70), said outer surface (66) being oriented generally along said central axis (70), said face (68) having an annular opening (76) and extending inwardly from said outer surface (66) in a direction toward said central axis (70), said annular opening (76) having sidewalls (78) and a bottom surface (80), said first and second members (12,14) being rotatable one relative to the other;
    first means (28) for supporting said first and second members (12,14) in rotation one relative to the other;
    a body (36) having first and second end portions (50,52) and a first side (42) and being positioned adjacent and about said annular opening (26);
    a first leg (38) having a sealing surface (58) and being connected to the second end portion (52) of the body (36) and extending outwardly from the first side (42) of the body (36) into said annular opening (76), said sealing surface (56) being in sealing, slidable contact with the face (68) of the second member (14) in said annular opening (76);
    a second leg (40) having a sealing surface (60) and being connected to the second end portion (52) of the body (36) and extending outwardly from the first side (42) of the body (36), said sealing surface (60) being in sealing, slidable contact with the second member (14) radially relative to said central axis (70) at the outer surface (66) of said second member (14); and
    second means (72) for sealably connecting said body (36) to said first member (12).

2. The seal assembly (10), as set forth in claim 1, wherein said first and second members (12,14) are a backing plate (20) and a hub (22) of a brake assembly (24), respectively.

3. The seal assembly (10), as set forth in claim 1, wherein said sealing surfaces (58,60) of the first and second legs (38,40) are oriented generally perpendicular one relative to the other.

4. The seal assembly (10), as set forth in claim 1, wherein said second leg (40) has first and second end portions (54,56), said first end portion (54) being connected to the second end portion (52) of the body (36) and extending outwardly from the first side (42) of the body (36) to a location along and spaced from said outer surface (66) of the second member (14), said second end portion (56) having the sealing surface (60) of said second leg (40).

5. The seal assembly (10), as set forth in claim 4, wherein said second end portion (56) of the second leg (40) has a lip (64) having the sealing surface (60) of said second leg (40) and extending generally inwardly from said second end portion (56) in a direction ($D_1$) toward the first end portion (50) of the body (36).

6. The seal assembly (10), as set forth in claim 1, wherein the sealing surface (58) of said first leg (38) slidably contacts said face (68) of the second member (14) at the bottom surface (80) of said annular opening (76).

7. The seal assembly (10), as set forth in claim 1, wherein said first leg (38) extends into said annular opening (76) of the face (68) at a location spaced from the sidewalls (78) of said opening (76).

8. The seal assembly (10), as set forth in claim 1, wherein said seal (16) forms a first annular chamber (84) with said second member (14), said chamber (84) being defined by the face (68) and outer surface (66) of the second member (14) and the first side (42) of the body (36) and the first and second legs (38,40).

9. The seal assembly (10), as set forth in claim 1, wherein said seal (16) forms a second annular chamber (90), with the first and second members (12,14), said chamber (90) being defined by said first and second members (12,14), the first leg (38), the body (36) and the first means (28) and being in communication with the annular opening (26) between said first and second members (12,14).

10. The seal assembly (10), as set forth in claim 1, wherein said sealing surface (58) of the first leg (38) urges against said face (68) of the second member (14).

11. The seal assembly (10), as set forth in claim 1, wherein said sealing surface (60) of the second leg (40) urges against said outer surface (66) of the second member (14).

12. The seal assembly (10), as set forth in claim 1, wherein the first side (42) of the body (36) has a first portion (86) extending between the first and second legs (38,40) angularly from and relative to said second leg (40).

13. The seal assembly (10), as set forth in claim 12, wherein said first portion (86) of the first side (42) extends angularly from said second leg (40) to a point about midway between said first and second legs (38,40) and extends generally perpendicular to said first and second legs (38,40) from said midway point to the first leg (38).

14. The seal assembly (10), as set forth in claim 1, wherein said first end portion (50) of the body (36) has an arm portion (92) extending at substantially right angles to the first leg (38) in a direction ($D_2$) from said first and second legs (38,40) and defining a second side (44) of the body (36), said second side (44) being oriented generally parallel to said first leg (36).

15. The seal assembly (10), as set forth in claim 1, wherein said seal (16) has a fastening element (96) and the first means (28) includes a mounting element (102) removably connected to said fastening element (96) and said first member (12).

16. The seal assembly (10), as set forth in claim 15, wherein said body (36) has a third side (46) and said fastening element (96) has first and second portions (98,100), said first portion (98) being connected to the body (36), said second portion (100) extending outwardly from said third side (46) of the body (36) and being removably connected to said mounting element (102).

17. The seal assembly (10), as set forth in claim 16, wherein said first portion (98) is an annular ring (110) positioned in said body (36).

18. The seal assembly (10), as set forth in claim 16, wherein said mounting element (102) has a plurality of openings (114) and is positioned about said body (36) and said second portion (100) of the fastening element (96) includes a plurality of flanges (112) each extending through a respective one of said openings (114) in the mounting element (102).

19. The seal assembly (10), as set forth in claim 18, wherein said mounting element (102) extends from said first member (12) and is in contact with the third side (46) of the body (36) and the first means (28) includes a plurality of nuts (116) each threadably engaging a respective one of the flanges (112) of the fastening element (96).

20. The seal assembly (10), as set forth in claim 15, wherein said mounting element (102) has first and second shield portions (106,108), said first shield portion (106) extending from said first member (12) to a position adjacent the body (36), said second shield portion (108) extending at generally right angles to said first shield portion (108) along and adjacent the second leg (40).

21. A seal assembly (10), comprising:

a first member (12);

a second member (14) having an outer surface (66), a face (68) and a central axis (70), said outer surface (66) being oriented generally along said central axis (70), said face (68) having an annular opening (76) and extending inwardly from said outer surface (66) in a direction toward said central axis (70), said annular opening having sidewalls (78) and a bottom surface (80), said first and second members (12,14) being rotatable one relative to the other and defining an annular opening (26) between said first and second members (12,14);

first means (28) for supporting said first and second members (12,14) in rotation one relative to the other;

a body (36) having first and second end portions (50,52) and a first side (42) and being positioned adjacent and about said annular opening (26);

a first leg (38) having a sealing surface (56) and being connected to the second end portion (52) of the body (36) and extending outwardly from the first side (42) of the body (36) into said annular opening (76) of the face (68), said sealing surface (56) being in sealing slidable contact with and urging against said face (68) at one of the bottom surface (80) and the sidewalls (78) of said annular opening (76) of the face (68);

a second leg (40) having first and second end portions (54,56) and a sealing surface (60) and being connected at the first end portion (54) to the second end portion (52) of the body (36), said first end portion (54) extending outwardly from the first side (42) of the body (36) to a location along and spaced from said outer surface (66) of the second member (14), said second end portion (56) having the sealing surface (60), said sealing surface (60) being in sealing, slidable contact with and urging against the second member (14) radially relative to the central axis (70) at the outer surface (66) of said second member (14); and second means (72) for sealably connecting said body (36) to said first member (12).

22. A seal assembly (10), comprising:

a brake drum (30);

a backing plate (20) connected to said brake drum (30);

a hub (22) having an outer surface (66), a face (68) and a central axis (70), said face (68) having an annular opening (76) and extending inwardly from said outer surface (66) in a direction toward said central axis (70), said outer surface (66) being positioned generally along said central axis (70), said annular opening (76) having sidewalls (78) and a bottom surface (80), said hub (22) and backing plate (20) being rotatable one relative to the other and defining an annular opening (26) between said hub (22) and backing plate (20);

first means for supporting said hub (22) and backing plate (20) in rotation one relative to the other;

a body (36) having first and second end portions (50,52) and a first side (42) and being positioned adjacent and about said annular opening (26);

a first leg (38) having a sealing surface (56) and being connected to the second end portion (52) of the body (36) and extending outwardly from the first side (42) of the body (36) into said annular opening, said sealing surface (56) being in sealing, slidable contact with the portion of the face (68) of the hub (22) in said annular opening (76);

a second leg (40) having a sealing surface (60) and being connected to the second end portion (52) of the body (36) and extending outwardly from the first side (42) of the body (36), said sealing surface (60) being in sealing, slidable contact with the hub (22) radially relative to said central axis (70) at the outer surface of said hub (22); and second means for sealably connecting said body (36) to said first member (12).

* * * * *